*(12)* United States Patent
Sasaki et al.

(10) Patent No.: US 10,691,542 B2
(45) Date of Patent: Jun. 23, 2020

(54) STORAGE DEVICE AND STORAGE METHOD

(71) Applicant: Toshiba Memory Corporation, Minato-ku (JP)

(72) Inventors: Yuki Sasaki, Kanagawa (JP); Takahiro Kurita, Kanagawa (JP); Atsuhiro Kinoshita, Kanagawa (JP)

(73) Assignee: Toshiba Memory Corporation, Minato-ku (JP)

( * ) Notice: Subject to any disclaimer, the term of this patent is extended or adjusted under 35 U.S.C. 154(b) by 363 days.

(21) Appl. No.: 14/023,901

(22) Filed: Sep. 11, 2013

(65) Prior Publication Data

US 2014/0201439 A1    Jul. 17, 2014

(30) Foreign Application Priority Data

Jan. 17, 2013    (JP) ................................. 2013-006754

(51) Int. Cl.
*G06F 11/10* (2006.01)
*G06F 12/02* (2006.01)

(52) U.S. Cl.
CPC ...... *G06F 11/1092* (2013.01); *G06F 12/0238* (2013.01); *G06F 2212/1048* (2013.01); *G06F 2212/7208* (2013.01)

(58) Field of Classification Search
CPC ............... G06F 3/0689; G06F 11/1076; G06F 11/2082; G06F 12/0246; G06F 11/1092
See application file for complete search history.

(56) References Cited

U.S. PATENT DOCUMENTS

| 5,072,371 | A | * | 12/1991 | Benner ............. G06F 15/17368 |
| | | | | 712/11 |
| 5,130,992 | A | * | 7/1992 | Frey, Jr. .............. G06F 11/1076 |
| | | | | 714/766 |
| 5,671,356 | A | | 9/1997 | Wang |
| 5,809,516 | A | * | 9/1998 | Ukai et al. .................... 711/114 |

(Continued)

FOREIGN PATENT DOCUMENTS

| CN | 102708073 A | 10/2012 |
| JP | 6-348516 | 12/1994 |

(Continued)

OTHER PUBLICATIONS

Office Action dated Jun. 30, 2016 in Chinese Patent Application No. 201310384208.3 (with English language translation).

(Continued)

*Primary Examiner* — Ryan Bertram
*Assistant Examiner* — Trang K Ta
(74) *Attorney, Agent, or Firm* — Oblon, McClelland, Maier & Neustadt, L.L.P.

(57) ABSTRACT

According to an embodiment, a storage device includes a plurality of memory nodes and a control unit. Each of the memory nodes includes a storage unit including a plurality of storage areas having a predetermined size. The memory nodes are connected to each other in two or more different directions. The memory nodes constitute two or more groups each including two or more memory nodes. The control unit is configured to sequentially allocate data writing destinations in the storage units to the storage areas respectively included in the different groups.

7 Claims, 16 Drawing Sheets

(56) References Cited

U.S. PATENT DOCUMENTS

| | | | |
|---|---|---|---|
| 5,862,403 A * | 1/1999 | Kanai | G06F 3/0601 |
| | | | 710/6 |
| 5,963,983 A | 10/1999 | Sakakura et al. | |
| 6,424,625 B1 | 7/2002 | Larsson et al. | |
| 6,457,100 B1 | 9/2002 | Ignatowski et al. | |
| 7,016,213 B2 | 3/2006 | Reeves et al. | |
| 7,457,916 B2 | 11/2008 | Suzuki et al. | |
| 8,041,990 B2 | 10/2011 | O'Connor et al. | |
| 2003/0188079 A1 * | 10/2003 | Singhal | G06F 11/1076 |
| | | | 710/313 |
| 2005/0108593 A1 * | 5/2005 | Purushothaman | G06F 11/2028 |
| | | | 714/4.11 |
| 2008/0301256 A1 * | 12/2008 | McWilliams et al. | 709/214 |
| 2009/0006886 A1 | 1/2009 | O'Connor et al. | |
| 2009/0094436 A1 * | 4/2009 | Deng | G06F 15/803 |
| | | | 712/11 |
| 2009/0216924 A1 | 8/2009 | Bennett | |
| 2009/0222596 A1 * | 9/2009 | Flynn | G06F 3/061 |
| | | | 710/22 |
| 2010/0082917 A1 | 4/2010 | Yang et al. | |
| 2010/0211721 A1 | 8/2010 | Resnick | |
| 2010/0241783 A1 | 9/2010 | Garcia et al. | |
| 2011/0041037 A1 * | 2/2011 | Frost | G06F 11/1068 |
| | | | 714/763 |
| 2011/0231737 A1 * | 9/2011 | Dachiku | G06F 11/1044 |
| | | | 714/770 |
| 2011/0320707 A1 * | 12/2011 | Usami | G06F 3/061 |
| | | | 711/114 |
| 2012/0079174 A1 * | 3/2012 | Nellans et al. | 711/103 |
| 2012/0117354 A1 * | 5/2012 | Tatsumura | H04L 12/6418 |
| | | | 711/200 |
| 2014/0129874 A1 * | 5/2014 | Zaltsman | G06F 12/16 |
| | | | 714/6.11 |
| 2014/0172939 A1 * | 6/2014 | McSherry | G06F 9/4436 |
| | | | 709/201 |

FOREIGN PATENT DOCUMENTS

| | | |
|---|---|---|
| JP | 7-110776 | 4/1995 |
| JP | 7-234763 | 9/1995 |
| JP | 7-311752 A | 11/1995 |
| JP | 10-276198 A | 10/1998 |
| JP | 2007-156582 | 6/2007 |
| JP | 2007-293726 | 11/2007 |
| JP | 2010-171557 A | 8/2010 |
| JP | 2011-134031 | 7/2011 |
| JP | 2011-170589 | 9/2011 |
| JP | 2012-103926 | 5/2012 |
| KR | 10-2010-0037416 A | 4/2010 |
| TW | 200919171 A | 5/2009 |

OTHER PUBLICATIONS

Office Action issued Oct. 16, 214 in Korean Patent Application No. 10-2013-0102531 (with English translation).

Office Action issued on Jan. 26, 2016 in Japanese Application No. 2013-006754 with English language translation. (8 pages).

Office Action issued Feb. 25, 2015 in Taiwanese Patent Application No. 102130683 (with English language translation).

Office Action issued Apr. 24, 2015 in Korean Patent Application No. 10-2013-0102531 (with English language translation).

\* cited by examiner

FIG.7

| | | | |
|---|---|---|---|
| P0 | P4 | 0 | 4 |
| 1 | 5 | P1 | P5 |
| 2 | 6 | 2 | 6 |
| 3 | 7 | 3 | 7 |
| P8 | P12 | 8 | 12 |
| 9 | 13 | P9 | P13 |
| 10 | 14 | 10 | 14 |
| 11 | 15 | 11 | 15 |
| 0 | 4 | 0 | 4 |
| 1 | 5 | 1 | 5 |
| P2 | P6 | 2 | 6 |
| 3 | 7 | P3 | P7 |
| 8 | 12 | 8 | 12 |
| 9 | 13 | 9 | 13 |
| P10 | P14 | 10 | 14 |
| 11 | 15 | P11 | P15 |

FIG.8

| | | | |
|---|---|---|---|
| P0 | P1 | 0 | 1 |
| 4 | 5 | P4 | P5 |
| 8 | 9 | 8 | 9 |
| 12 | 13 | 12 | 13 |
| P2 | P3 | 2 | 3 |
| 6 | 7 | P6 | P7 |
| 10 | 11 | 10 | 11 |
| 14 | 15 | 14 | 15 |
| 0 | 1 | 0 | 1 |
| 4 | 5 | 4 | 5 |
| P8 | P9 | 8 | 9 |
| 12 | 13 | P12 | P13 |
| 2 | 3 | 2 | 3 |
| 6 | 7 | 6 | 7 |
| P10 | P11 | 10 | 11 |
| 14 | 15 | P14 | P15 |

FIG.9

| | | | |
|---|---|---|---|
| P0 | 1 | 0 | P1 |
| P4 | 5 | 4 | P5 |
| P8 | 9 | 8 | P9 |
| P12 | 13 | 12 | P13 |
| 2 | 3 | 2 | 3 |
| 6 | 7 | 6 | 7 |
| 10 | 11 | 10 | 11 |
| 14 | 15 | 14 | 15 |
| 0 | 1 | 0 | 1 |
| 4 | 5 | 4 | 5 |
| 8 | 9 | 8 | 9 |
| 12 | 13 | 12 | 13 |
| P2 | 3 | 2 | P3 |
| P6 | 7 | 6 | P7 |
| P10 | 11 | 10 | P11 |
| P14 | 15 | 14 | P15 |

FIG.10

| LOGICAL ADDRESS LA | $x_D$ | $y_D$ | PAGE ADDRESS P |
|---|---|---|---|
| 0 | 0 | 0 | 0 |
| 1 | 1 | 0 | 0 |
| 2 | 2 | 0 | 0 |
| ... | ... | ... | ... |
| $\frac{N_X}{2} - 1$ | $\frac{N_X}{2} - 1$ | 0 | 0 |
| $\frac{N_X}{2}$ | 0 | 1 | 0 |
| $\frac{N_X}{2} + 1$ | 1 | 1 | 0 |
| ... | ... | ... | ... |
| $\left(\frac{N_X}{2} \times \frac{N_Y}{2}\right) - 1$ | $\frac{N_X}{2} - 1$ | $\frac{N_Y}{2} - 1$ | 0 |
| $\frac{N_X}{2} \times \frac{N_Y}{2}$ | 0 | 0 | 1 |
| $\left(\frac{N_X}{2} \times \frac{N_Y}{2}\right) + 1$ | 1 | 0 | 1 |
| ... | ... | ... | ... |

FIG.12

| Num: $N_{D0}$ <br> PA: $(x_D, y_D)$ | Num: $N_{D1}$ <br> PA: $\left(x_D + \dfrac{N_X}{\sqrt{N_R+1}}, y_D\right)$ | ... | ... | Num: $N_{D(\sqrt{N_R+1}-1)}$ <br> PA: $\left(x_D + \dfrac{(\sqrt{N_R+1}-1)N_X}{\sqrt{N_R+1}}, y_D\right)$ |
|---|---|---|---|---|
| Num: $N_{D(\sqrt{N_R+1})}$ <br> PA: $\left(x_D, y_D + \dfrac{N_Y}{\sqrt{N_R+1}}\right)$ | Num: $N_{D(\sqrt{N_R+1}+1)}$ <br> PA: $\left(x_D + \dfrac{N_X}{\sqrt{N_R+1}}, y_D + \dfrac{N_Y}{\sqrt{N_R+1}}\right)$ | ... | ... | Num: $N_{D(2\sqrt{N_R+1}-1)}$ <br> PA: $\left(x_D + \dfrac{(\sqrt{N_R+1}-1)N_X}{\sqrt{N_R+1}}, y_D + \dfrac{N_Y}{\sqrt{N_R+1}}\right)$ |
| Num: $N_{D(2\sqrt{N_R+1})}$ <br> PA: $\left(x_D, y_D + \dfrac{2N_Y}{\sqrt{N_R+1}}\right)$ | ... | ... | ... | ... |
| ... | ... | ... | ... | ... |
| Num: $N_{D((\sqrt{N_R+1}-1)\sqrt{N_R+1})}$ <br> PA: $\left(x_D, y_D + \dfrac{(\sqrt{N_R+1}-1)N_Y}{\sqrt{N_R+1}}\right)$ | ... | ... | ... | Num: $N_{D(N_R(\sqrt{N_R+1}-1))}$ <br> PA: $\left(x_D + \dfrac{(\sqrt{N_R+1}-1)N_X}{\sqrt{N_R+1}}, y_D + \dfrac{(\sqrt{N_R+1}-1)N_Y}{\sqrt{N_R+1}}\right)$ |

FIG.13

| γ | NUMBER OF DISTRIBUTION NODE FOR PARITY | a | b | c | d |
|---|---|---|---|---|---|
| 0 | $N_{D0}$ | p | d1 | d2 | d3 |
| 1 | $N_{D1}$ | d3 | p | d1 | d2 |
| 2 | $N_{D2}$ | d2 | d3 | p | d1 |
| 3 | $N_{D3}$ | d1 | d2 | d3 | p |

STORAGE DEVICE AND STORAGE METHOD

CROSS-REFERENCE TO RELATED APPLICATIONS

This application is based upon and claims the benefit of priority from Japanese Patent Application No. 2013-006754, filed on Jan. 17, 2013; the entire contents of which are incorporated herein by reference.

FIELD

Embodiments descried herein relate generally to a storage device and a storage method.

BACKGROUND

There is known a disk array device which includes a plurality of hard disk devices, treats the plurality of the hard disk devices as one storage device, and distributes data to the plurality of the hard disk devices to be stored therein. In the hard disk device, since a head moves on a hard disk, which is a recording medium, to read and write data, speedy reading can be expected due to shortening a head seek time by performing sequential writing operations.

In addition, a storage device capable of easily increasing capacity by connecting a plurality of memory nodes each having a storage element and a data transmission function has been developed. In the case where each memory node receives data of which destination is the memory node itself, the memory node performs a predetermined operations of reading, writing, or the like. In the case where each memory node receives data of which destination is not the memory node itself, the memory node transmits the received packets to another appropriate memory node. Each memory node repeats appropriate data transmission, so that the data can reach a target memory node.

In the disk array device of the related art, a physical array of the hard disk devices is not considered. Therefore, in the case where the access control for the disk array device of the related art is directly applied to the storage device configured by connecting the memory nodes to each other, a stand-by time of data transmission is lengthened due to the access concentration on the memory node, so that there is a problem in that the throughput is deteriorated.

Namely, if the sequential writing in the hard disk device is directly applied to the storage device configured by connecting the memory nodes to each other, access is concentrated on one memory node, and thus, the stand-by time of data transmission occurs, so that reading efficiency may be deteriorated.

BRIEF DESCRIPTION OF THE DRAWINGS

FIG. 7 is a diagram illustrating an example of sequential writing according to the embodiment;

FIG. 8 is a diagram illustrating an example where a memory node group is changed every time when writing to one page in each group according to the embodiment;

FIG. 9 is a diagram illustrating a method of selecting a memory node in which parity is stored in a memory node group according to the embodiment;

FIG. 10 is a diagram illustrating an example of determining a physical address and a page address of a memory node from a logical address in a cyclic writing system according to the embodiment;

FIG. 12 is a diagram illustrating a position relationship between memory node groups according to the embodiment;

FIG. 13 is a table listing an example of correspondence among values γ, data, and parities according to the embodiment;

DETAILED DESCRIPTION

In general, according to one embodiment, a storage device includes a plurality of memory nodes and a control unit. Each of the memory nodes includes a storage unit including a plurality of storage areas having a predetermined size. The memory nodes are connected to each other in two or more different directions. The memory nodes constitute two or more groups each including two or more memory nodes. The control unit is configured to sequentially allocate data writing destinations in the storage units to the storage areas respectively included in the different groups.

Exemplary embodiments of a storage device and a storage method will be explained below in detail with reference to the accompanying drawings. The present invention is not limited to the embodiments.

Embodiments

Figure 1:
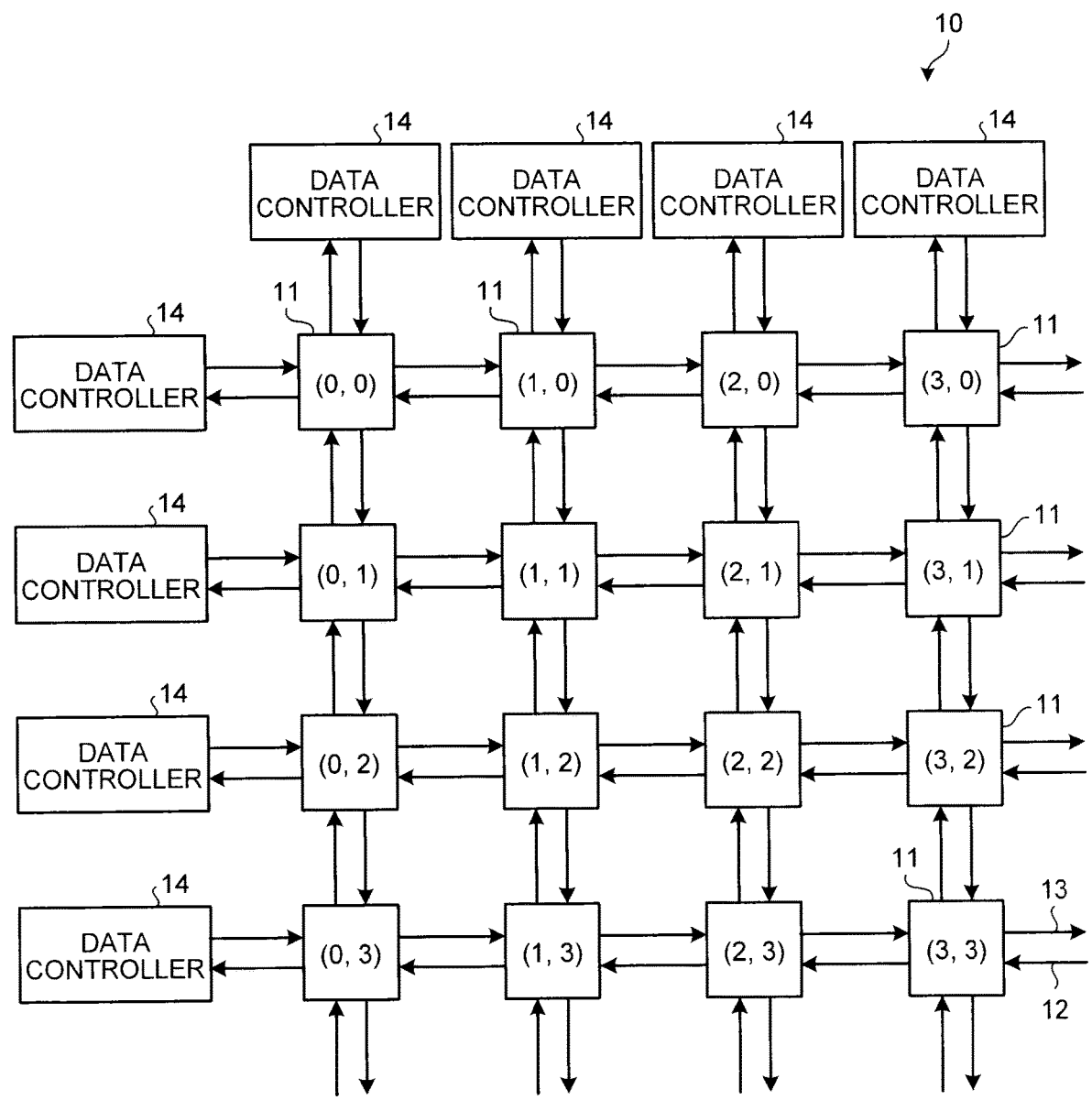
FIG. 1 is a block diagram illustrating a configuration of an example of a storage device according to an embodiment.

FIG. 1 illustrates a configuration of an example of a storage device 10 according to an embodiment. The storage device 10 has a configuration where a plurality of memory nodes 11 each having a storage function and a data transmission function are connected to each other. The data transmission function is implemented as a transmission method of allowing each memory node 11 to effectively transmit data packets.

In FIG. 1, in the storage device 10, data are distributed and stored to the plurality of the memory nodes 11. In the example of FIG. 1, each memory node 11 is arranged at a lattice point of a square lattice. The coordinates of the lattice point are represented by (x, y), and the physical address of the memory node 11 arranged at the lattice point is represented by the physical address $(x_D, y_D)$ corresponding to the coordinates of the lattice point. In addition, in the example of FIG. 1, the memory node 11 located at the upper left corner has the physical address (0, 0) of the origin, and as the memory node 11 is shifted in the horizontal direction (X direction) and the vertical direction (Y direction), the physical address is increased by an integer value.

Each memory node 11 includes four input ports 12 and four output ports 13 and is connected to the adjacent memory nodes 11 through the four input ports 12 and the four output ports 13. More specifically, the two adjacent memory nodes 11 facing each other are connected to each other through the input port 12 and the output port 13 therebetween.

In addition, each memory node 11 is connected to memory nodes 11 adjacent in two or more different directions. For example, the memory node 11 indicated by physical address (0, 0) at the upper left corner in FIG. 1 is connected to the memory node 11 indicated by physical address (1, 0) adjacent in the X direction and the memory node 11 indicated by physical address (0, 1) adjacent in the Y direction, that is, a direction different from the X direction. In addition, in FIG. 1, the memory node 11 indicated by physical address (1, 1) is connected to four memory nodes 11 indicated by physical addresses (1, 0), (0, 1), (2, 1), and (1, 2) adjacent in four different directions.

The storage device 10 includes one or more data controllers 14 which perform calculation of parity and issue data reading/writing commands. Each of the data controllers 14 is connected through the input port 12 and the output port 13 to the memory node 11. At this time, in the case where the communication protocol of the memory nodes 11 and the communication protocol of the data controller 14 are different, an adaptor may be installed therebetween. In the example of FIG. 1, each of the data controllers 14 is connected to each end of the x and y directions of the square lattice where the memory nodes 11 are arranged.

The data to be stored in each memory node 11 are supplied from an external host computer to the storage device 10, and input into a select circuit (not illustrated). The select circuit checks the state of each data controller 14 to select a data controller 14 having a processing margin and transmits the data to the selected data controller 14.

In this manner, since the storage device 10 according to the embodiment includes the plurality of the data controllers 14 and the plurality of the memory nodes 11, a plurality of data transmission paths exist between the data entrance and the storage device, so that the storage device is advantageous for failure tolerance. Namely, even in the case where maintenance is performed or failure occurs, the storage device 10 can use a transmission path other than the maintenance site or the failure site, so that a system in which complete stoppage of operation is unnecessary is implemented. In addition, the storage device 10 can achieve scale-out characteristics by simply increasing the modules such as the memory nodes 11 or the data controllers 14, so that the storage device 10 can be mounted at a low cost and small labor in comparison to the method of increasing a server in the related art.

Each memory node 11 includes a plurality of blocks as storage areas, and each block includes a plurality of pages. The data writing in the memory node 11 is performed in units of a page. In addition, the data erasing in the memory nodes 11 is performed in units of a block. Hereinafter, for the description, it is assumed that one memory node 11 includes one block, and one block includes four pages.

In FIG. 1, the memory nodes 11 are arranged at the lattice points of the square lattice. However, the arrangement of the memory nodes 11 is not limited to the above example. Namely, the shape of the lattice is sufficient if each of the memory nodes 11 arranged at the lattice points is connected to memory nodes 11 adjacent in two or more different directions, and for example, the shape may be a triangle, a hexagon, or the like. In addition, in FIG. 1, the memory nodes 11 are two-dimensionally arranged. However, the memory nodes 11 may be three-dimensionally arranged.

Figure 2:
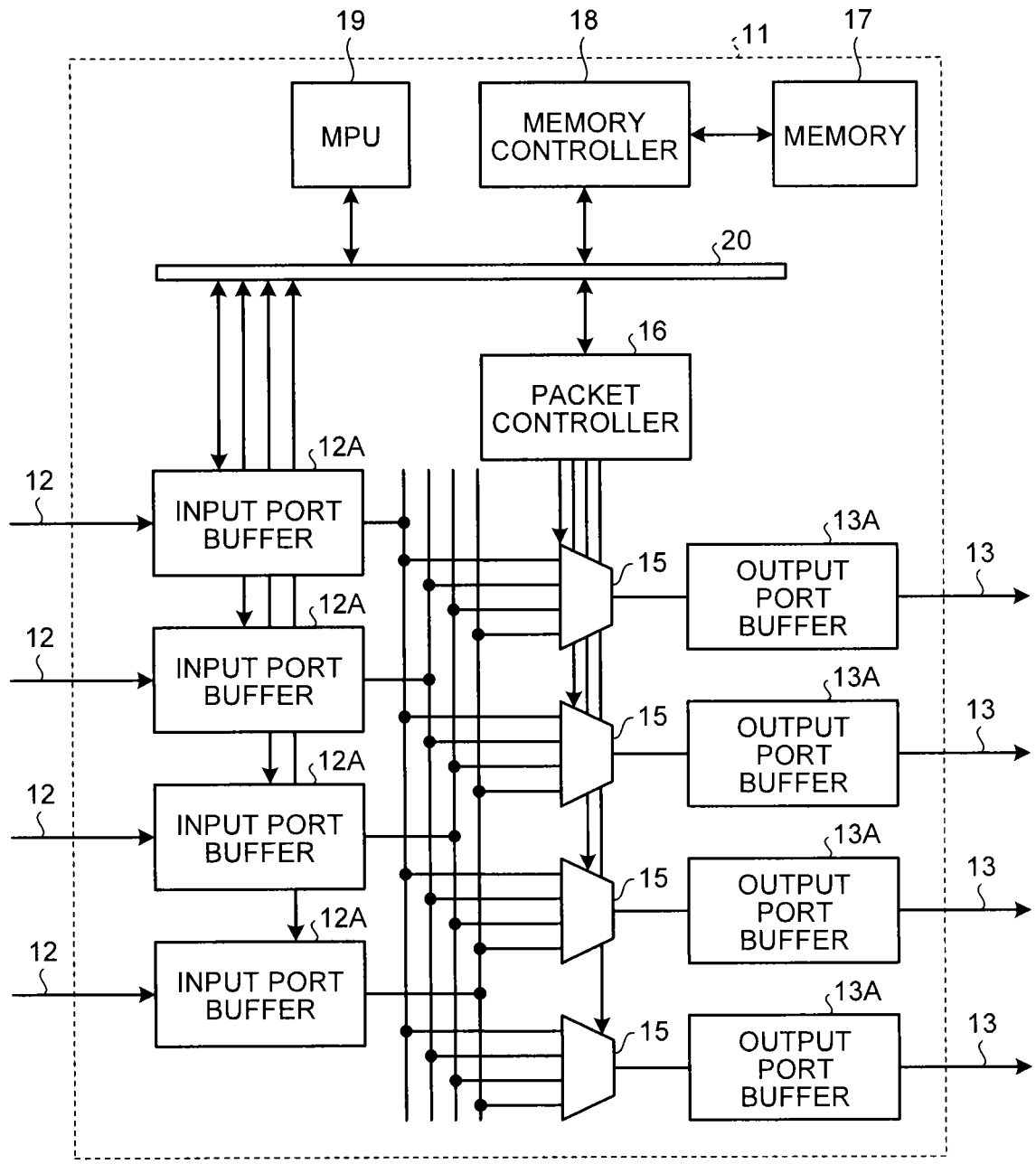
FIG. 2 is a block diagram illustrating a configuration of an example of a memory node according to the embodiment.

FIG. 2 illustrates a configuration of an example of the memory node 11 according to the embodiment. The memory node 11 includes four input port buffers 12A corresponding to input ports 12, four output port buffers 13A corresponding to output ports 13, four selectors 15, a packet controller 16, a memory 17, a memory controller 18, and a micro-processing unit (MPU) 19.

The packet controller 16, the memory controller 18, the MPU 19, and the input port buffers 12A are connected to each other through a local bus 20 so as to be communicatable. In addition, the memory 17 is connected to the local bus 20 through the memory controller 18.

Each input port buffer 12A is connected to a corresponding input port 12. The data are transmitted between the memory nodes 11 in units of a packet having a predetermined size. A packet is a unit of data transmission and includes a header section including at least a transmission destination address and a transmission source address and a data section. Each output port buffer 13A is connected to a corresponding output port 13. Each selector 15 controls connection between the input port buffers 12A and the output port buffers 13A according to a control signal of the packet controller 16.

In the configuration, the packet input to the input port 12 is temporarily stored in the input port buffer 12A. The selector 15 is input with a packet from the input port buffer 12A and is input with a control signal from the packet controller 16. The selector 15 selects one of the input packets and outputs the selected packet to the output port buffer 13A according to the control signal. The output port buffer 13A temporarily stores the packet output from the selector 15 and outputs the packet to the output port 13. The packet controller 16 controls the output of the selector 15.

The memory 17 is a storage device having a plurality of memory cells which store data. The memory 17 may be, for example, NAND type flash memory, a bit cost scalable memory (BiCS), magneto-resistive random access memory (MRAM), phase-change memory (PcRAM), resistive random access memory (RRAM (registered trade mark)), and the like. The memory controller 18 controls operations of writing, reading, and erasing with respect to the memory 17. The MPU 19 executes necessary calculation in the memory node 11. In addition, the MPU can be used for a general-purpose calculation, and instead of the MPU, a dedicated hardware specialized in specific processes may be used.

A packet received by the memory node 11 is stored through the input port 12 in the input port buffer 12A. The packet controller 16 determines, based on two information items of the transmission destination (target) address included in the packet and the address of the memory node 11 itself, whether or not the destination of the received packet is the memory node 11 itself.

In the case where it is determined that the destination of the received packet is the memory node 11 itself, the packet controller 16 performs a designated operation among the writing, reading, and other operations in the memory 17 of the memory node 11 itself. On the other hand, in the case where the destination of the received packet is not the memory node 11 itself, the packet controller 16 determines the adjacent memory node 11, to which the received packet is to be transmitted, based on the information of the transmission destination address included in the packet and the information of the address of the memory node 11 itself and transmits a control signal to the selector 15. The selector 15 outputs the packet to the corresponding output port buffer 13A in response to the control signal.

Address Allocation According to Embodiment

Next, the embodiment will be descried in more detail. First, the related art applicable to the embodiment will be described in brief. As one of distributive data storage method in a disk array device including a plurality of hard disk devices, a technique called as a redundant array of independent disks (RAID) capable of improving performance and reliability of access processes by treating the plurality of the hard disk devices as one storage device is well known.

The RAIDs are classified into levels 0 to 6, and in the levels 3 to 6, parity is maintained as redundant information for recovering data at the time of disk disorder. The RAID is implemented by mapping physical addresses and physical page addresses corresponding to logical addresses to the plurality of the hard disk devices in the disk array device.

In the embodiment, the RAID (for example, RAID of level 5) is applied to the above-described storage device 10 including the plurality of the memory nodes which are connected to each other. Namely, the storage device 10 generates parity from a predetermined amount of input data and distributes and stores the input data and the parity into the plurality of the memory nodes 11. At this time, the storage device 10 virtually divides the plurality of the memory nodes 11 into a plurality of groups and distributes and stores the input data and the parity into the groups. Namely, the plurality of the memory nodes 11 included in the storage device 10 constitute two or more groups including a predetermined number of the memory nodes 11.

Figure 3:
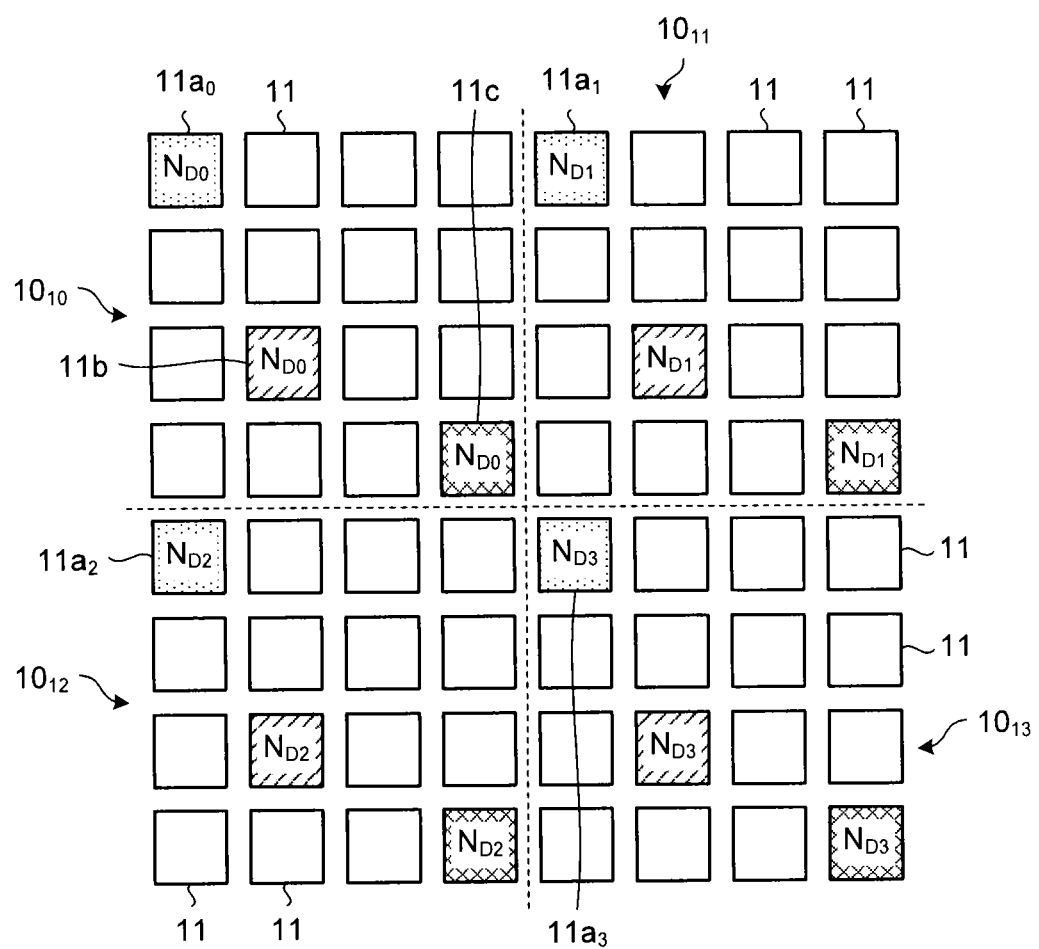
FIG. 3 is a diagram illustrating an example where four groups are formed by dividing a plurality of memory nodes in different directions according to the embodiment.
Figure 4:
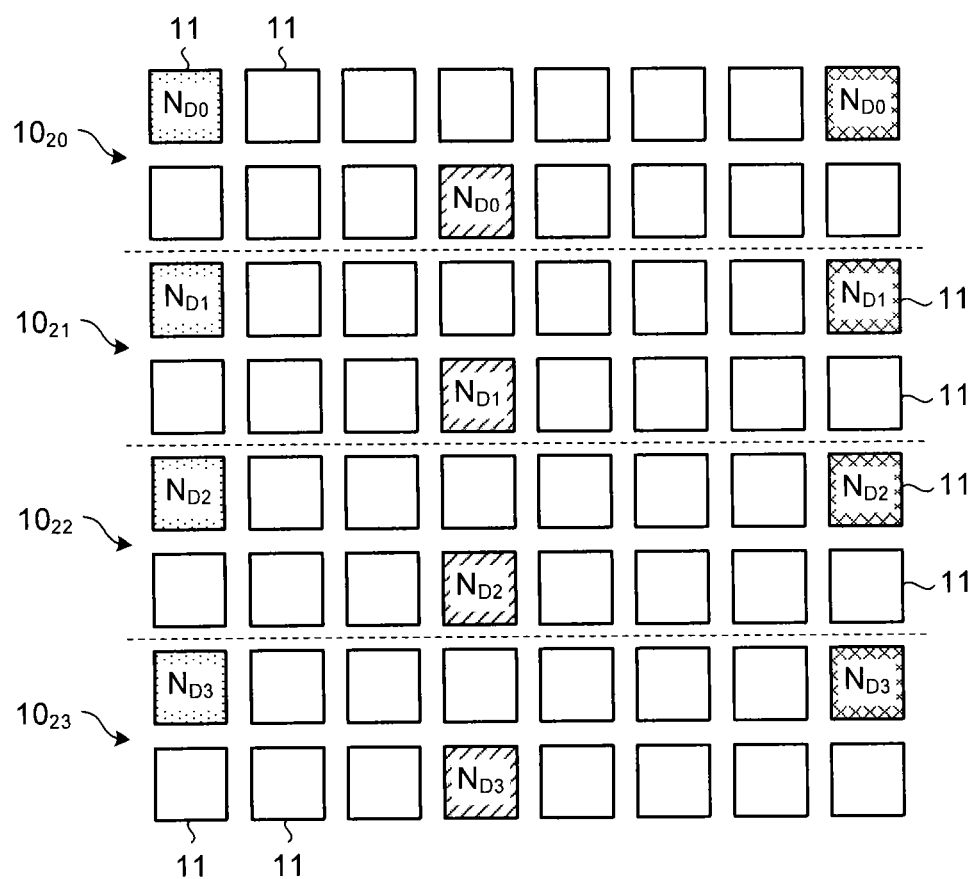
FIG. 4 is a diagram illustrating an example where four groups are formed by dividing a plurality of memory nodes in the same direction according to the embodiment.

FIGS. 3 and 4 illustrate examples of selecting the memory nodes 11 constituting the RAID in the storage device 10 where the plurality of the memory nodes 11 are connected to each other. Hereinafter, in the array of the memory nodes 11, the number of memory nodes 11 aligned in the X direction in the figure is denoted by a value $N_X$, and the number of memory nodes 11 aligned in the Y direction is denoted by a value $N_Y$. In addition, the number of memory nodes 11 constituting the RAID is denoted by a value ($N_R+1$), and the selected memory node 11 is defined by a distributed node number [$N_{D0}$ to $N_{DNR}$]. Hereinafter, the memory node 11 defined by a distributed node number $N_{Dn}$ is represented by a selection memory node $N_{Dx}$.

In the selection memory node $N_{Dn}$, the indexes "n" are numbers uniquely allocated to the selected memory nodes 11. For example, the indexes are increased from the upper left corner of the lattice in the X direction and are increased downward from the upper side of the lattice.

The memory node 11 constituting the RAID denotes each of the memory node 11 in which a predetermined amount of the data and parity generated from the predetermined amount of the data are stored. For example, the data piece indicated by one logical address (LA) is divided into two or more data pieces, and one parity is generated by using each divided data piece. The divided data pieces and the parity generated from the data are stored in different memory nodes 11.

Hereinafter, for the description, a data piece indicated by one logical address LA is assumed to be divided into three data pieces having a size of a writing unit (for example, a page) of each memory node 11, and parity having the size of writing unit are assumed to be generated from the three data pieces. Namely, value $N_R=3$, and the number of memory nodes 11 constituting the RAID is 4. In addition, a group of the memory nodes 11 constituting one RAID is called a memory node group.

FIGS. 3 and 4 illustrate the examples of selecting the memory nodes 11 in the case of the value $N_R=3$. FIG. 3 illustrates an example of dividing a plurality of the memory nodes 11 in directions different from each other to form four groups. More specifically, the plurality of the memory nodes 11 arranged on a square lattice are divided by two in each of the X and Y directions (hereinafter, referred to as a cross-shaped division) to form four groups $10_{10}$, $10_{11}$, $10_{12}$, and $10_{13}$.

FIG. 4 illustrates an example of dividing a plurality of the memory nodes 11 in the same direction to form four groups. More specifically, the plurality of the memory nodes 11 arranged on a square lattice are divided by four in the X direction to form four groups $10_{20}$, $10_{21}$, $10_{22}$, and $10_{23}$ in the Y direction.

As illustrated in FIGS. 3 and 4, one memory node 11 is selected from each array of divided memory nodes 11, so that the memory nodes 11 constituting the RAID can be physically distributed.

In the example of FIG. 3, if the physical address of the selection memory node $N_{D0}$ is denoted by the address ($x_D$, $y_D$), in the case where the memory node 11 at the position indicated by the address ($x_D$, $y_D$) is selected from the upper left group $10_{10}$ in the cross-shaped divided array, the condition of the following Formula (1) is satisfied.

$$\left(0 \le x_D \le \frac{N_X}{2} - 1, 0 \le y_D \le \frac{N_Y}{2} - 1\right) \quad (1)$$

In addition, therefore, the physical addresses of the selection memory nodes $N_{D1}$ to $N_{D3}$ are expressed by the following Formulae (2), (3), and (4), respectively.

$$N_{D1}: \left(x_D + \frac{N_X}{2}, y_D\right) \quad (2)$$

$$N_{D2}: \left(x_D, y_D + \frac{N_Y}{2}\right) \quad (3)$$

$$N_{D3}: \left(x_D + \frac{N_X}{2}, y_D + \frac{N_Y}{2}\right) \quad (4)$$

In the case of the cross-shaped division, in this manner, by selecting the selection memory node $N_{D0}$, the memory node group constituting the RAID can be uniquely determined.

For example, in the case where the memory node $11a_0$ is selected as the selection memory node $N_{D0}$, a group of the memory nodes 11 constituting the RAID is determined from the memory node $11a_0$ and the memory nodes $11a_1$, $11a_2$, and $11a_3$ by the above-described Formulae (2) to (4). In the case where the memory node $11b$ or the memory node $11c$ is selected as the selection memory node $N_{D0}$, similarly, the memory node group constituting the RAID is determined by the above-described Formulae (2) to (4).

In the example of FIG. 4, in the case where the selection memory node $N_{D0}$ is selected from the uppermost group $10_{20}$ in the array of the four-division in the Y direction, the condition of the following Formula (5) is satisfied.

$$\left(0 \le x_D \le N_X - 1, 0 \le y_D \le \frac{N_Y}{4} - 1\right) \quad (5)$$

Therefore, the physical addresses of the selection memory nodes $N_{D1}$ to $N_{D3}$ are expressed by the following Formulae (6), (7), and (8), respectively.

$$N_{D1} : \left(x_D, y_D + \frac{N_Y}{4}\right) \quad (6)$$

$$N_{D2} : \left(x_D, y_D + \frac{N_Y}{2}\right) \quad (7)$$

$$N_{D3} : \left(x_D, y_D + \frac{3N_Y}{4}\right) \quad (8)$$

Namely, since this is considered to be division by a fixed number, the physical addresses can be obtained by calculating the following Formulae (9), (10), and (11), respectively. In addition, the operator "Integer" denotes extraction of an integer part, and the operator "%" denotes a redundant operator.

$$N_{D1} : \left( \begin{array}{c} x_D + \text{Integer}\left[N_X \times \frac{N_Y}{4}\right] \% N_X, y_D + \\ \text{Integer}\left[\frac{\text{Integer}\left[N_X \times \frac{N_Y}{4}\right]}{N_X}\right] \end{array} \right) \quad (9)$$

$$N_{D2} : \left( \begin{array}{c} x_D + \text{Integer}\left[2N_X \times \frac{N_Y}{4}\right] \% N_X, y_D + \\ \text{Integer}\left[\frac{\text{Integer}\left[2N_X \times \frac{N_Y}{4}\right]}{N_X}\right] \end{array} \right) \quad (10)$$

$$N_{D3} : \left( \begin{array}{c} x_D + \text{Integer}\left[3N_X \times \frac{N_Y}{4}\right] \% N_X, y_D + \\ \text{Integer}\left[\frac{\text{Integer}\left[3N_X \times \frac{N_Y}{4}\right]}{N_X}\right] \end{array} \right) \quad (11)$$

FIGS. 3 and 4 illustrate examples where the value $N_X$ and the value $N_Y$ are the same even-numbered value, and the arrays of the memory nodes 11 have symmetry with respect to the X direction and the Y direction. On the contrary, in the case where the value $N_X$ and the value $N_Y$ are different, for example, in the example of the cross-shaped division of FIG. 3, there is a possibility that the memory nodes may not be equally divided by four in the cross shape. In this case, although the symmetry of the memory nodes 11 in which information is to be written may be secured by using one, or a plurality of rows or columns of the memory nodes 11 as a spare disk, the capacity efficiency may be deteriorated, so that the applicability thereof is limited.

One-directional division of the plurality of the memory nodes 11 (refer to FIG. 4) or fixed-number division of the plurality of the memory nodes 11 may be flexibly adapted to the case where the array of the memory nodes 11 is not symmetric. However, as illustrated in FIG. 4, according to a combination of a size of the array and the number of memory nodes 11 constituting the RAID, there may be a case where each memory node 11 included in one memory node group is biased to a particular column. As the memory node group, as the number of the memory nodes 11, in which reading or writing of a series of data is to be performed, arranged in one column or one row is increased, the possibility that transmitting data are congested during the data transmission is increased.

As the method of mapping the physical addresses to the memory nodes 11, any one of the method of dividing the memory nodes 11 in different directions illustrated in FIG. 3 and the method of dividing the memory nodes 11 in one direction illustrated in FIG. 4 may be considered. It is preferable that the method be selected by considering influence of a possibility of deterioration in capacity efficiency or an occurrence of congestion as described above. Hereinafter, the mapping of the physical addresses to the memory nodes 11 illustrated in FIG. 3 is described by performing cross-shaped division of the array.

Figure 5:
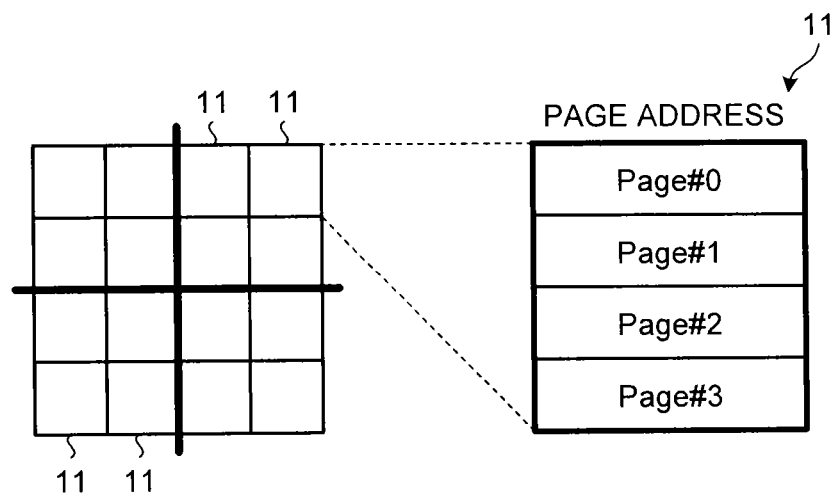
FIG. 5 is a schematic diagram illustrating a configuration of a memory node according to the embodiment.
Figure 6:
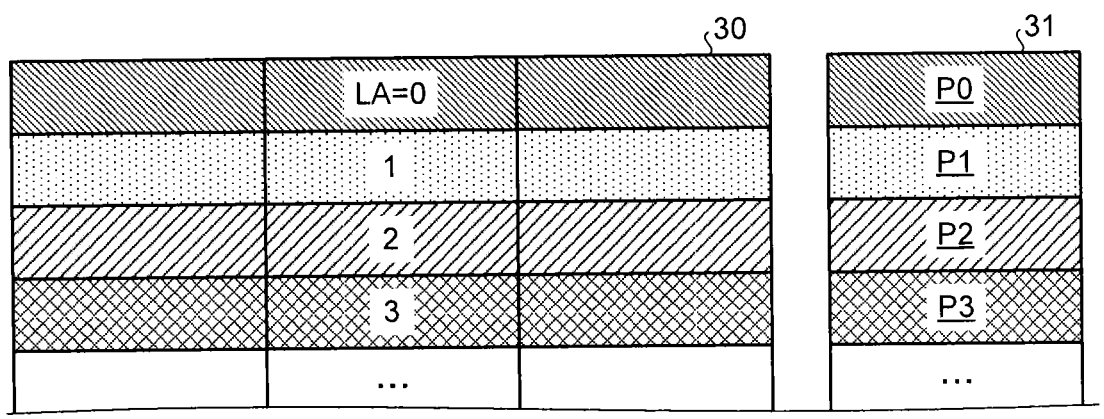
FIG. 6 is a schematic diagram illustrating an example of a configuration of data which are to be written in the memory node according to the embodiment.

Next, the method of mapping the physical addresses to the memory nodes 11 according to the embodiment will be described more in detail. FIGS. 5 and 6 schematically illustrate a configuration of the memory nodes 11 and a configuration of the data used for the following description.

FIG. 5 schematically illustrates the configuration of the memory node 11. As described above, the memory node 11 includes a plurality of blocks each of which is a unit of data erasing. The block includes a plurality of pages which is a storage area corresponding to the unit of data writing. Hereinafter, as illustrated in FIG. 5, it is assumed that the memory node 11 includes one block including pages Page#0, Page#1, Page#2, and Page#3 indicated by page addresses #0, #1, #2, and #3. In addition, it is assumed that the storage device 10 is includes a total of 16 memory nodes 11 of four memory nodes 11 in the X direction and four memory nodes 11 in the Y direction and to form an array with value $N_X$=value $N_Y$=4, and the 16 memory nodes 11 are virtually divided into four groups each including four memory nodes 11. In the above configuration, the case where data pieces and the parities generated from the data pieces are distributed and stored into the memory nodes 11 is considered.

FIG. 6 schematically illustrates an example of a configuration of data to be written in the memory node 11. The data 30 illustrates an example of a data piece to be transmitted from an upper level device such as a host computer device to the storage device 10. Each data piece is indicated by the logical address LA and is transmitted from an upper level device to the storage device 10. Each data piece that is transmitted to the storage device 10 is input through a select circuit (not illustrated) to one of the data controllers 14. The data controller 14 generates parity 31 based on the input data.

In the example, the data controller 14 divides the data 30 indicated by one logical address LA into three data pieces having a size equal to the size of page. In addition, similarly, one parity 31 having a size equal to the size of page is generated from the three-divided pieces of data. A memory node group is formed with the data 30 indicated by the one logical address LA and the parity corresponding to the data 30.

FIG. 7 illustrates an example of sequential writing in which writing is continuously preformed until the pages of the one memory node group are filled. Namely, in the sequential writing, with respect to the page of the memory node 11 in which the data or parity of the one memory node group are written, until the page is filled, the data and parity of another memory node group are written.

In FIG. 7, a plurality of the memory nodes 11 is divided into four groups $10_{30}$, $10_{31}$, $10_{32}$, and $10_{33}$. In this example, the data pieces of the logical addresses LA=0 to 3 and the parities P0 to P3 corresponding to the data pieces are written in the pages of the upper left memory node 11 in each of the groups $10_{30}$ to $10_{33}$.

According to the sequential writing, for example, in the case where a storage device configured with an HDD (hard disk drive) performs data reading (sequential reading) of consecutive logical addresses LA, high speed of the reading time can be expected due to shortening a head seek time.

FIG. 8 illustrates an example where the memory node group is changed every time when the data piece or parity is written in one page in each of the groups $10_{30}$ to $10_{33}$. Namely, in the method illustrated in FIG. 8, every time when the data piece or parity is written in one page, the groups $10_{30}$ to $10_{33}$ are sequentially changed. In addition, in each of the groups $10_{30}$ to $10_{33}$, the memory nodes 11 in which the data piece or parity is written in the page are sequentially changed. The writing method illustrated in FIG. 8 is called cyclic writing.

In the cyclic writing illustrated in FIG. 8, with respect to the data of the logical address LA=0, the divided data pieces and the parity are sequentially written in the page Page#0 of the upper left memory node 11 of each of the groups $10_{30}$ to $10_{33}$. Next, with respect to the data of the logical address LA=1, the memory node 11 as the writing destination is changed to the upper right memory node 11 in each of the groups $10_{30}$ to $10_{33}$, and the divided data pieces and the parity are sequentially written in the page Page#0 of the upper right memory node 11. Next, the groups $10_{30}$ to $10_{33}$ are sequentially changed and the memory nodes 11 as the writing destination are sequentially changed in each of the groups $10_{30}$ to $10_{33}$, the divided data pieces and the parity of the logical address LA=2 and the divided data pieces and the parity of the logical address LA=3 are sequentially written in the page Page#0. Hereinafter, if writing is completed with respect to all the same pages of each of the memory nodes 11, the page address is changed. Namely, the divided data pieces and the parity of the logical address LA=4 are sequentially written in the page Page#1 of the upper left memory node 11 in each of the groups $10_{30}$ to $10_{33}$.

According to the cyclic writing, for example, in a storage device configured with an SSD (solid state drive), even at the time of sequential reading, access concentration is suppressed by parallel access to the memory nodes 11, so that high efficiency in reading can be expected.

The method of mapping the physical addresses to the memory nodes 11 is not limited to the above-described method. For example, a method of changing the memory node group every time when writing is performed on a plurality of pages but on all the pages of the one memory node 11 may be considered. This method is a combination of the above-described sequential writing and the cyclic writing. It is preferable that the method of mapping the physical addresses be selected by considering the configuration or use environment of the storage device 10. Hereinafter, the case of employing the cyclic writing will be described.

The method of selecting the memory nodes 11 in which the parities P0 to P15 are to be stored in the memory node group constituting the RAID will be described with reference to FIG. 9 and FIG. 8 described above. In the embodiment, the writing destinations of the parities generated from the data of adjacent logical addresses LA are allocated to different memory nodes 11.

FIG. 9 illustrates an example of changing the distributed node number of the memory node 11 in which the parity is to be stored when the memory node group is changed. In FIG. 9, the pages where writing of the same memory node group is performed are indicated by the same hatching. In the example of FIG. 9, with respect to the memory node group including a parity P0, the parity P0 is written in the group $10_{30}$ according to the distributed node number of the selection memory node $N_{D0}$. With respect to the memory node group including a parity P1, the parity P1 is written in the group $10_{31}$ according to the distributed node number of the selection memory node $N_{D1}$. With respect to the memory node group including a parity P2, the parity P2 is written in the group $10_{32}$ according to the distributed node number of the selection memory node $N_{D2}$. With respect to the memory node group including a parity P3, the parity P3 is written in the group $10_{33}$ according to the distributed node number of the selection memory node $N_{D3}$.

According to this method, the memory node 11 in which the parity is stored is the same all the time in the memory node group. However, since all the parities are not written in the same memory node 11, the problem of deterioration in performance of such as a RAID level 4 does not easily occur. In the case where data updating is frequently performed, writing in the memory node 11 in which the parity is stored for updating the parity is frequently performed. Therefore, process performance may be deteriorated due to the access concentration. In addition, in the case where the storage device is configured with memories such as NAND flash memories of which the number of writing is limited, the memory node 11 in which the parity is stored reaches lifetime first, and thus, there is a problem in that the operation time to replacement of the memory node 11 as a system is shortened.

If the distributed node number of the memory node 11 in which the parity is stored is denoted by "$N_{D\gamma}$", the index $\gamma$ can be selected as $\gamma = LA \% (N_R + 1) = LA \% 4$.

FIG. 8 described above illustrates an example of changing the distributed node numbers of the memory nodes 11 in which the parities are stored in the case where writing is performed on the same page of each of the memory nodes 11 in all the memory node group and the page address is changed. In other words, in the method illustrated in FIG. 8, in the case where a cycle of the data allocation of all the memory node group to the same page of each of the memory nodes 11, that is, the storage areas of which the positions corresponds to each other is completed, the group of the parity writing destination is changed.

In the example of FIG. 8, the parities P0, P1, P2, and P3 of the memory node groups including the parities P0, P1, P2, and P3 are written in the group $10_{30}$ according to the distributed node number of the selection memory node $N_{D0}$. If the writing in the memory node group is completed, since the writing is completed on all the pages of the page address Page#0 in each of the memory nodes 11, the next writing is performed with the page address being changed. The parities P4, P5, P6, and P7 of the memory node group including the next parities P4, P5, P6, and P7 are written in the group $10_{31}$ according to the distributed node number of the selection memory node $N_{D1}$. In this manner, in the case where writing is performed on all the pages of the same physical address in each of the memory nodes 11 and the page address is changed, the distributed node number of the memory node 11 in which the parity is to be written is changed.

In this method, in the sequential reading, until the page address is changed, the access is biased to the area other than the memory node 11 in which the parity is stored. On the other hand, in this method, the memory nodes 11 in which the parities are stored are distributed. Namely, even in the case where data updating is frequently performed, the parity writing operations are distributed over the entire memory nodes. Therefore, the method illustrated in FIG. 8 is useful for the system which is configured with memories of which lifetime is limited in comparison to the method illustrated in FIG. 9.

The selection memory node $N_{D\gamma}$ for storing the parity can be determined by the following Formula (12).

$$\gamma = \text{Integer}\left[\frac{LA}{N_X \times \frac{N_Y}{4}}\right] = \text{Integer}\left[\frac{LA}{4}\right] \quad (12)$$

It is preferable that the method of selecting the memory node 11 in which the parity is to be stored illustrated in FIGS. 8 and 9 be selected by considering a configuration of a storage device including the storage device 10 and a data reading method.

Hereinafter, the case where the memory nodes in which the parities are to be stored by cyclic writing illustrated in FIG. 8 are distributed will be described.

Figure 11:
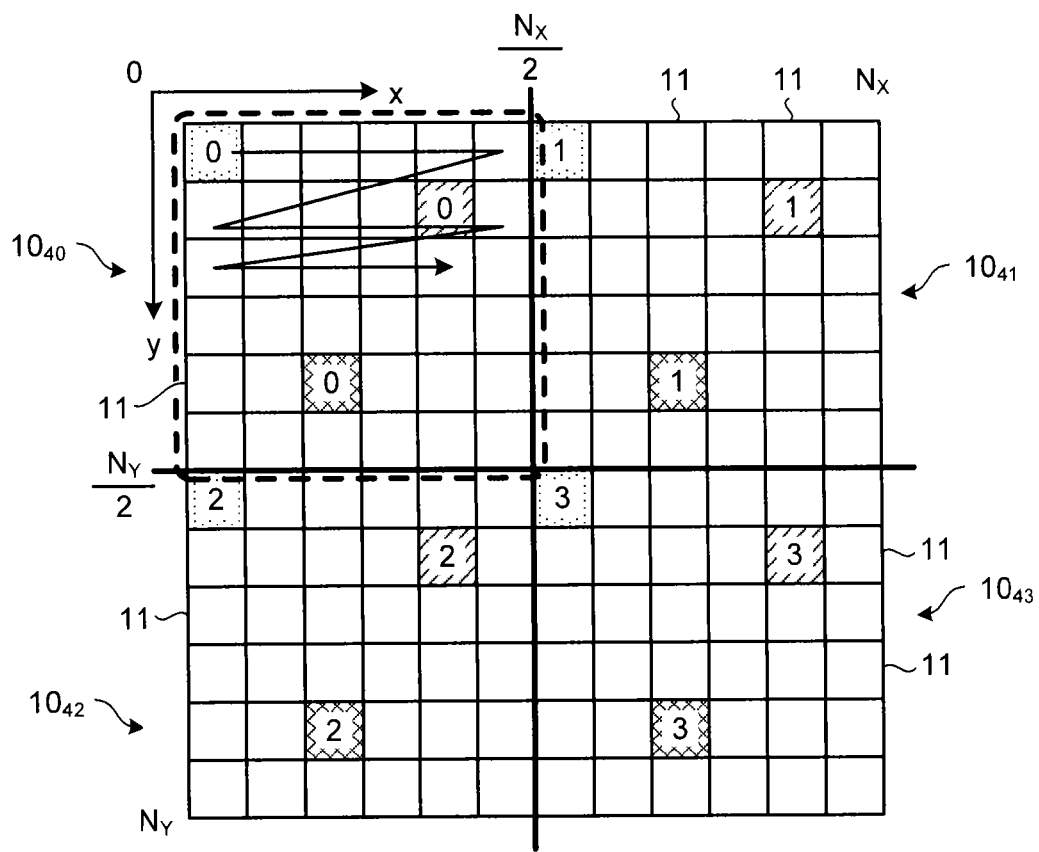
FIG. 11 is a diagram illustrating a physical address increasing direction in a group according to the embodiment.

FIG. 10 illustrates an example of determining the physical address (x, y) and the page address P of the memory node 11 from the logical address LA in the cyclic writing system. FIG. 11 illustrates the increasing direction of the physical address (x, y) illustrated in FIG. 10. In the example of FIG. 11, the memory nodes 11 arranged with value $N_X=12$ and value $N_Y=12$ are divided in a cross-shaped division manner to form the groups $10_{40}$, $10_{41}$, $10_{42}$, and $10_{43}$. For example, in the group $10_{40}$, the physical address (x, y) is increased in the X direction by every memory node 11 and is increased in the Y direction by every memory node 11.

Since the selection memory nodes $N_{D0}$ to $N_{D3}$ determining the memory node group constituting the RAID can be uniquely determined from the physical address ($x_D$, $y_D$) of the selection memory node $N_{D0}$, the description only about the selection memory node $N_{D0}$ is sufficient. In addition, the selection memory nodes $N_{D0}$ to $N_{D3}$ are included in the groups $10_{40}$, $10_{41}$, $10_{42}$, and $10_{43}$, respectively.

In FIG. 10, the value $x_D$ in the physical address ($x_D$, $y_D$) is repeated among [0, 1, 2, . . . , ($N_X/2$)–1], the value $x_D$ is obtained as $x_D=LA\%(N_X/2)$. Since the value $y_D$ is repeated ($N_X/2$) times among [0, 1, 2, . . . , ($N_X/2$)–1], the value $y_D$ is obtained by the following Formula (13). In addition, since the page address P is increased by 1 every time the logical address LA is increased by the value ($N_XN_Y/4$), the page address P is obtained by the following Formula (14).

$$y_D = \text{Integer}\left[\frac{LA - N_X \times \frac{N_Y}{4} \times \text{Integer}\left[\frac{LA}{N_X \times \frac{N_Y}{4}}\right]}{\frac{N_X}{2}}\right] \quad (13)$$

$$P = \text{Integer}\left[\frac{LA}{N_X \times \frac{N_Y}{4}}\right] \quad (14)$$

FIG. 12 illustrates positional relationship of the memory node groups in the case where it is assumed that each of the value $N_X$ and the value $N_Y$ are a power of 2 and the value ($N_R+1$) is a power of 4. At this time, the physical address of the selection memory node $N_{D0}$ exists in a range indicated by the following Formula (15). In FIG. 12, the distributed node number is indicated by "Num", and the physical address is indicated by "PA".

$$\left(0 \le x_D \le \frac{N_X}{\sqrt{N_R+1}} - 1, 0 \le y_D \le \frac{N_Y}{\sqrt{N_R+1}} - 1\right) \quad (15)$$

If the values in FIG. 12 are generalized and the value α and the value β are set to be integers in ranges expressed by Formulae (16) and (17), respectively, the index "n" of the distributed node number "$N_{Dn}$" is n=(α+1)(β+1)–1, so that the physical address is expressed by the following Formula (18).

$$0 \le \alpha \le \sqrt{N_R+1} - 1 \quad (16)$$

$$0 \le \beta \le \sqrt{N_R+1} - 1 \quad (17)$$

$$\left(x_D + \frac{\alpha N_X}{\sqrt{N_R+1}}, y_D + \frac{\beta_Y}{\sqrt{N_R+1}}\right) \quad (18)$$

A general formula for selecting the distributed node number "$N_{D\gamma}$" of the memory node 11 for parity storage in the memory node group according to the logical address LA is obtained as Formula (19). In addition, general formulas for determining the physical address ($x_D$, $y_D$) and the page address P of the memory nodes from the logical address LA are expressed by Formulae (20), (21), and (22).

$$\gamma = \text{Integer}\left[\frac{LA}{N_X \times \frac{N_Y}{N_R+1}}\right] \quad (19)$$

$$x_D = LA\%\left(\frac{N_X}{\sqrt{N_R+1}}\right) \quad (20)$$

$$y_D = \text{Integer}\left[\frac{LA - N_X \times \frac{N_Y}{N_R+1} \times \text{Integer}\left[\frac{LA}{N_X \times \frac{N_Y}{N_R+1}}\right]}{\frac{N_X}{\sqrt{N_R+1}}}\right] \quad (21)$$

$$P = \text{Integer}\left[\frac{LA}{N_X \times \frac{N_Y}{N_R+1}}\right] \quad (22)$$

Next, in the case of the value $N_R=3$, an example of a writing command for writing the data D in a logical address LA is described. The data D are divided in a size of the unit of writing (for example, the page). Herein, the data D are divided into three data pieces d1, d2, and d3 according to the value $N_R$. In addition, the parity p is generated from an exclusive OR of the data pieces d1, d2, and d3.

FIG. 13 illustrates an example of correspondence among the values γ for determining the distributed node number of the memory node 11 in which the parity p is to be stored, the data pieces d1 to d3 and the parities p. Herein the variables a, b, c, and d are variables for storing the data pieces.

By using the above results, the writing commands Write for writing the data D of the logical address LA in the memory nodes 11 of the storage device 10 are expressed by, for example, the following Formulae (23) to (26).

Write[$x_D$(LA),$y_D$(LA),$N_{D0}$,γ(LA),P(LA),a] (23)

Write[$x_D$(LA),$y_D$(LA),$N_{D1}$,γ(LA),P(LA),b] (24)

Write[$x_D$(LA),$y_D$(LA),$N_{D2}$,γ(LA),P(LA),c] (25)

Write[$x_D$(LA),$y_D$(LA),$N_{D3}$,γ(LA),P(LA),d] (26)

In Formulae (23) to (26), since the value γ is a value derived for determining parity charge, the value γ may not be transmitted as a packet.

It is preferable that, at the time of writing, failure determination is performed according to counting of the number of receptions of the message Reply, which is a response to the writing command Write from the memory node 11 at the time of writing, by the data controller 14, and time-out monitoring.

For example, as described above, in the case where the RAID is configured with four data pieces of three data pieces d1 to d3 and one parity p, if the count value of the number of receptions of the message Reply to the one writing command Write within a time-out period is 4, it may be determined that the writing is normally performed.

On the other hand, in the case where the count value of the number of receptions of the message Reply at the time of time-out is 3, it may be determined that the writing of one data piece among the four data pieces constituting the RAID is not normally performed. As factors causing the writing not to be normally performed, physical positional relationship of the memory nodes 11 in which the writing is to be performed, life breakage due to congestion, and the like may be considered.

In the case where these factors exist, data rewriting is performed on the same memory node 11, and it is checked whether or not the message Reply of the memory node 11 is received. At this time, the case where physical disconnection of the path between the data controller 14 issuing the writing command Write and the memory node 11 or node abnormality exists may also be considered. Therefore, it is preferable that, in the data re-writing, the position of the data controller 14 issuing the writing command Write or the direction of the data path to the memory node 11 is changed.

In the case where one message Reply corresponding to data re-writing is not returned, data reading can be available through the recovery by the RAID. In this case, it is preferable that error is notified to output a message indicating which memory node 11 is likely to be in failure, so that the system is leaded to rapid rebuilding. In addition, if the spare memory node 11 is prepared, the reliability can be improved by writing the data in the area to save the data therein. However, this is not the only possible case. Alternatively, it is also effective that a writing command Write is issued again to a new logical address LA.

In addition, the reading commands Read for reading the data D of the logical address LA from the memory nodes 11 of the storage device 10 can be expressed by, for example, the following Formulae (27) to (30). In the reading command Read, variables a to d for data storage can be omitted.

$$\text{Read}[x_D(LA), y_D(LA), N_{D0}, \gamma(LA), P(LA), a] \quad (27)$$

$$\text{Read}[x_D(LA), y_D(LA), N_{D1}, \gamma(LA), P(LA), b] \quad (28)$$

$$\text{Read}[x_D(LA), y_D(LA), N_{D2}, \gamma(LA), P(LA), c] \quad (29)$$

$$\text{Read}[x_D(LA), y_D(LA), N_{D3}, \gamma(LA), P(LA), d] \quad (30)$$

In Formulae (27) to (30), since the value $\gamma$ is a value derived for determining parity charge, the value $\gamma$ may not be transmitted as a packet. In addition, since the variables a, b, c, and d are for storing the read data or parities, the variables may not be transmitted as a packet.

Similarly to the writing, it is preferable that, at the time of reading, failure determination is performed according to time-out monitoring.

As the reading method, a first reading method of reading only the data pieces d1, d2, and d3 and a second reading method of reading the data pieces d1, d2, and d3 and the parity p are considered.

In the first reading method, since packet transmission for parity reading is unnecessary, a rate of occurrence of congestion is decreased, and thus, the throughput is likely to be improved. However, since the parity reading command is first executed at the time when it is perceived that one data piece is not read, time may be unnecessarily taken in the reading at time of failure.

In the second reading method, since the packet for reading the parity p is added to the packet in the first reading method, a rate of occurrence of data congestion may be increased in comparison to the first reading method. Further, since the parity (p) reading command is already executed in a parallel manner at the time when it is perceived that one data piece is not read, it is considered that data recovering by RAID is speedily performed. In addition, in the case where the parity p can be read prior to one of the other data pieces d1 to d3 in the same memory node group, the data piece which is not yet read is calculated by using the other two data pieces which are already read in the memory node group, and it may be considered that the data piece is treated to be read. In addition, after all the data pieces d1 to d3 and the parity p of the memory node group reach the data controller 14, data matching is checked by using the parity p, and the read data pieces d1 to d3 are output, so that the reliability can be improved.

It is preferable that the methods are selected according to whether the user focuses on speed or safety.

Fault Treatment Applicable to Embodiment

Next, failure detection and data recovery applicable to the storage device 10 according to the embodiment will be described. The failure determination for the memory node 11 in the storage device 10 may be implemented by allowing the data controller 14 to perform counting the number of receptions of the message Reply at the time of accessing the memory node 11 and counting the number of corrections of inverted bits caused by data error. For example, threshold values of the count values are set, and if at least one count value exceeds the corresponding threshold value, it is determined that the data transmission regarding to the memory node 11 is abnormal.

In the storage device 10 illustrated in FIG. 1, since each memory node 11 has four-directional paths, even in the case where one path to the memory node 11 of interest is disconnected, each memory node 11 can access a target memory node 11 through other paths. Then, the processes are completed, the message Reply is transmitted as the signal. In the case where the reading/writing operations are performed on the divided data pieces through the RAID, if the message Reply is returned from the memory nodes 11 constituting the RAID, it can be checked that all the operations succeed. However, in the case where access congestion occurs or all the four-directional paths are disconnected, packets disappear due to life breakage, so that the message Reply cannot be received. In this case, since the system state can be checked by counting the number of message Reply, it is possible to immediately cope with the problem of failure or the like.

The memory node 11 may include a Busy transmission line (not illustrated) and an error transmission line (not illustrated). With this configuration, the states of adjacent memory nodes 11 can be detected.

In the case where the input port buffer 12A is in use, the memory node 11 connected to the in-use input port buffer 12A cannot transmit packets. Therefore, a Busy signal is transmitted through a Busy transmission line to the memory node 11 connected to the in-use input port buffer 12A to notify of the state that packets cannot be received (Busy state).

In addition, in the case of path abnormality, physical address mismatch, or a state (error state) of being inaccessible to the memory 17, an error signal can be transmitted through an error transmission line to all the adjacent memory nodes 11 to notify of the error state. However, in the case of the path abnormality such as disconnection of line, the error state may be notified to only the line where the path abnormality occurs.

For example, in the routing, when the memory node 11 in the path receives packets, the packets are not allowed to be transmitted to the memory node 11 which issues the Busy state or the error state, so that the packets can reach a target memory node 11 by bypassing the memory node 11 issuing the Busy state or the error state.

If the Busy state of the target memory node 11 is detected, the packet may be stored until the Busy signal disappears. If the error signal of the target memory node 11 is detected, it is possible to speedily cope with the situation by notifying a client device of the error state.

As the number of error bits included in the read data is larger, the memory node 11 has not accurately stored therein the data. Therefore, it is considered that largeness of the number of error bits can be sufficiently used to determine whether or not the memory node 11 is in failure.

In general, at the time of data writing in the recording medium, the error correction code generated based on the to-be-written data together with the data is written in the recording medium. Then, at the time of reading, error correction is performed on the read data by using the error correction code. At this time, the number of corrected bits on which the error correction is performed can be detected and outputted. The number of corrected bits corresponds to the number of error bits. In the case where the read data contains an error beyond the error correctability using the error correction code, the error correction is not performed. In the storage device 10, the MPU 19 in each of the memory nodes 11 or dedicated hardware performs the error correction.

As the method of counting the number of error bits of the read data, there is a first counting method of allowing the data controller 14 to count the number of corrected bits of the data received from the memory node 11, and a second counting method of allowing the memory node 11 to add defective bit information (information on the number of corrected bits) based on the result of error correction to the read data, and to respond to the data controller 14.

Any one of the counting methods needs processing to be performed by the data controller 14. In the second counting method, distributed processing is performed in a plurality of the memory nodes 11, so that the processing to be performed by the data controller 14 is reduced. Therefore, the possibility of the bottle neck of the data controller 14 itself can be reduced.

A specific failure detection method is as follows. A threshold value of the number of corrected bits is set in advance, and when the number of corrected bits in a memory node 11 reaches or exceeds the threshold value, the data controller 14 may notify of an error indicating that there is a possibility that the memory node 11 is in failure. In this case, since the data can be read, it is not securely determined that the memory node 11 is in failure. However, since the memory node 11 having high possibility of failure can be checked, it is possible to speedily cope with the occurrence of failure.

A plurality of threshold values for the number of corrected bits may be set. In this case, since priority can be designated to the possibility of failure, it is possible to more effectively operate the system. In this case, since the data for managing the system are also increased, the load of processes may be increased. In addition, when the memory node 11 is replaced at the time of predicting the failure, higher reliability of the storage device 10 can be secured. However, the cost is also increased. Therefore, it is preferable that the threshold value of the number of corrected bits or the number of threshold values is set by taking the above-described factors into consideration according to the user's request.

Next, the data recovering process of recovering the data stored in the memory node 11 will be described more in detail. In addition, the case of requiring the data recovering process for the memory node 11 is, for example, a case where failure of a memory node 11 is detected or a memory node 11 is replaced due to maintenance or the like. Herein, the replacement of the memory node 11 denotes the case where a user detaches the memory node 11 assembled with the storage device 10 and then installs a new memory node 11 thereon. Before and after the replacement, the physical address of the memory node 11 does not change.

Figure 14:
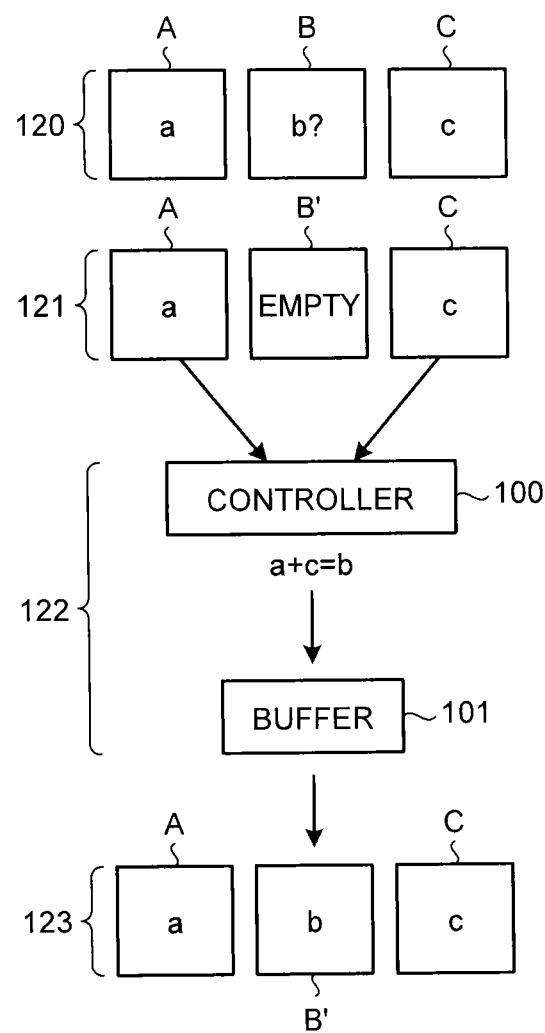
FIG. 14 is a conceptual diagram of a first data recovering process according to the embodiment.
Figure 15:
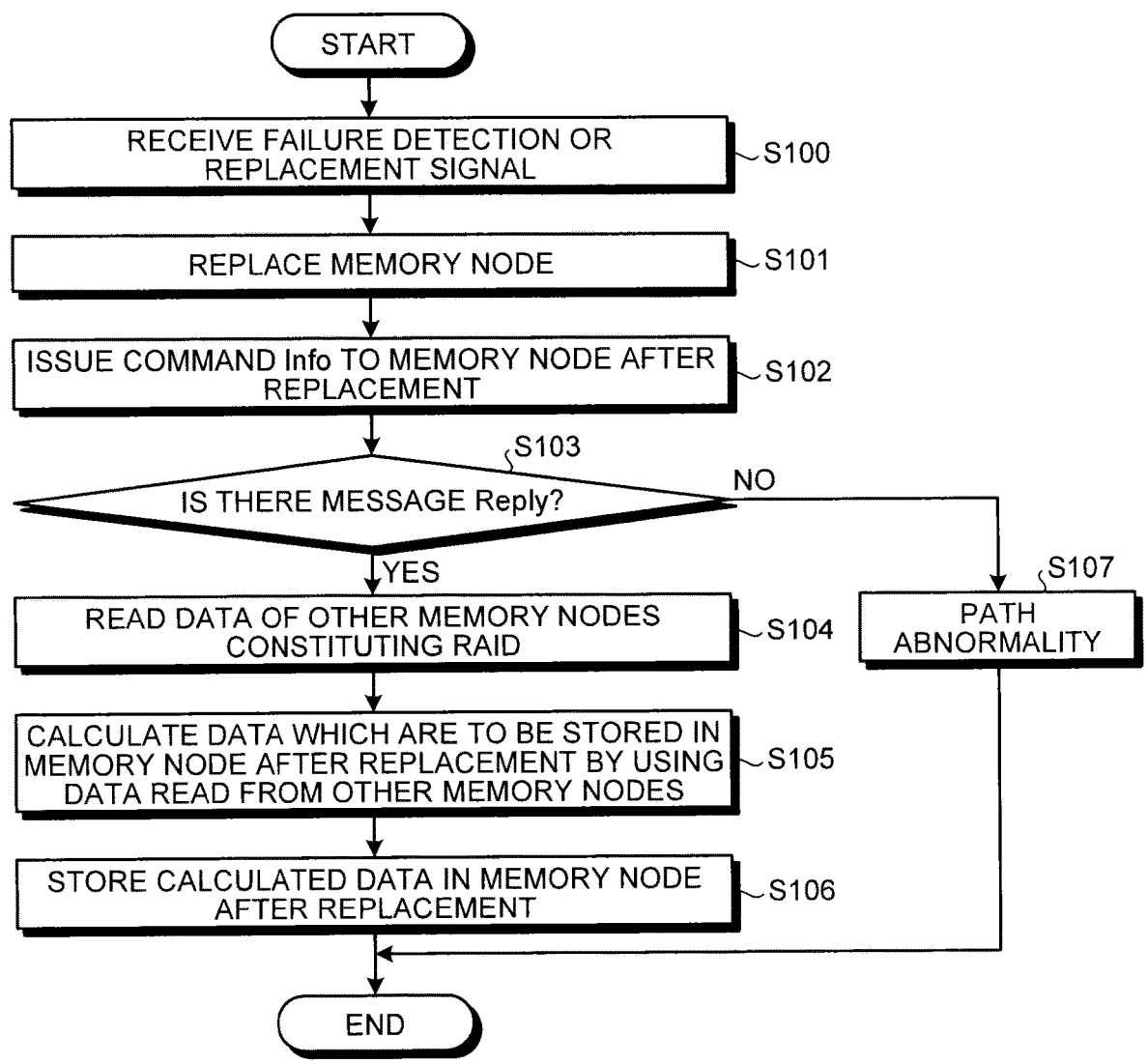
FIG. 15 is a flowchart illustrating an example of the first data recovering process according to the embodiment.

FIG. 14 is a conceptual diagram of a first data recovering process. In the first data recovering process, a RAID is configured with three memory nodes A, B, and C corresponding to the memory nodes 11, respectively. In FIG. 14, a controller 100 corresponds to the data controller 14 of FIG. 1 to perform data reading/writing in the memory nodes A, B, and C, issuance of various types of commands, parity calculation, and the like. A buffer 101 is used by the controller 100 to temporarily store data. FIG. 15 is a flowchart illustrating an example of the first data recovering process. Data pieces a, b, and c are respectively stored in the memory nodes A, B, and C, and any one of the data pieces (for example, data piece c) is assumed to be parity.

Hereinafter, the case of performing failure detection or replacement of the memory node B and recovering the data piece b stored in the memory node B will be described as an example (refer to Section 120 of FIG. 14). In the flowchart of FIG. 15, in Step S100, in the case where the failure detection of the memory node B or a replacement signal for the memory node B is notified, the memory node B proceeds to a replacement stand-by state. Next, in Step S101, the memory node B is replaced with a new memory node B'. At this time, the memory node B' is empty, and no data are stored therein (refer to Section 121 of FIG. 14).

When it is confirmed that the memory node B has been replaced with the memory node B', a command Info is transmitted from the controller 100 to the memory node B' (Step S102). The command Info is a command for returning information on a target memory node and enables a check on whether data from the controller 100 reaches a transmission destination. The transmission of the command Info in Step S102 is performed, for example, by manipulating, by a user, a manipulator (not illustrated)) of the storage device 10 or an upper level device connected to the storage device 10.

Next, in Step S103, the controller 100 determines whether a message Reply to the command Info transmitted in Step S102 is received. When it is determined that the message Reply is received, it may be determined that there is no path abnormality and the replacement of the memory node B with the memory node B' is normally completed. In this case, the process proceeds to Step S104, and the controller 100 reads the data pieces a and c stored in the other memory nodes A and C constituting the RAID together with the memory node B before the replacement.

Next, in Step S105, the controller 100 recovers the data piece b by performing calculation by using the data pieces a and c read from the memory nodes A and C in Step S104

(refer to Section 122 of FIG. 14). The recovered data piece b is temporarily stored in the buffer 101.

Next, in Step S106, the controller 100 reads the recovered data piece b from the buffer 101 and writes the recovered data piece b in the memory node B' after the replacement (refer to Section 123 of FIG. 14). Since the physical address of the memory node B' after the replacement is the same as the physical address of the memory node B before the replacement, the access to the memory node B' after the replacement is performed similarly to the access to the memory node B before the replacement. In this manner, the recovery of the data piece b according to the replacement of the memory node B is completed, and a series of the processes in the flowchart of FIG. 15 is ended.

In the case where it is determined in Step S103 that the message Reply is not received, the process proceeds to Step S107, and it is considered that there is a possibility of occurrence of path abnormality such as disconnection of the path between the controller 100 and the memory node B'. In this case, there is also a possibility that path abnormality does not occur but the replaced memory node B' is in failure. The controller 100 outputs a message indicating, for example, occurrence of path abnormality or the like, and a series of the processes in the flowchart of FIG. 15 are ended.

In the case where the message Reply is not received due to the path abnormality, the physical address of this position cannot be used. However, since the storage device 10 has a plurality of paths to a certain physical address, the storage device 10 has high tolerance to the path abnormality.

Figure 16:
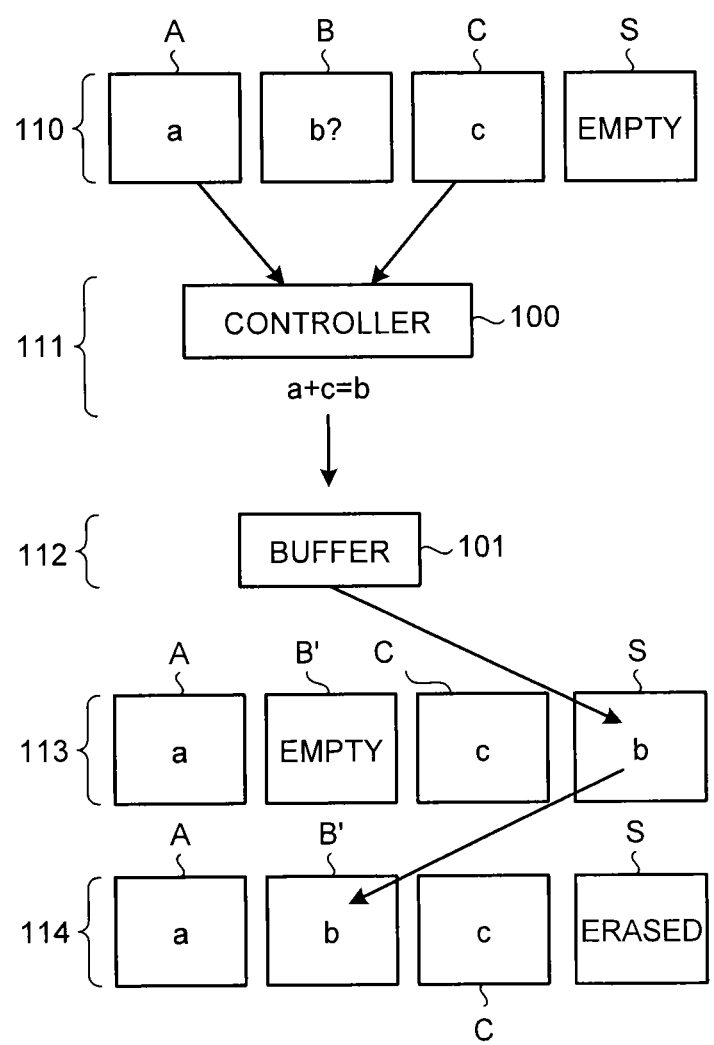
FIG. 16 is a conceptual diagram of a second data recovering process according to the embodiment.
Figure 17:
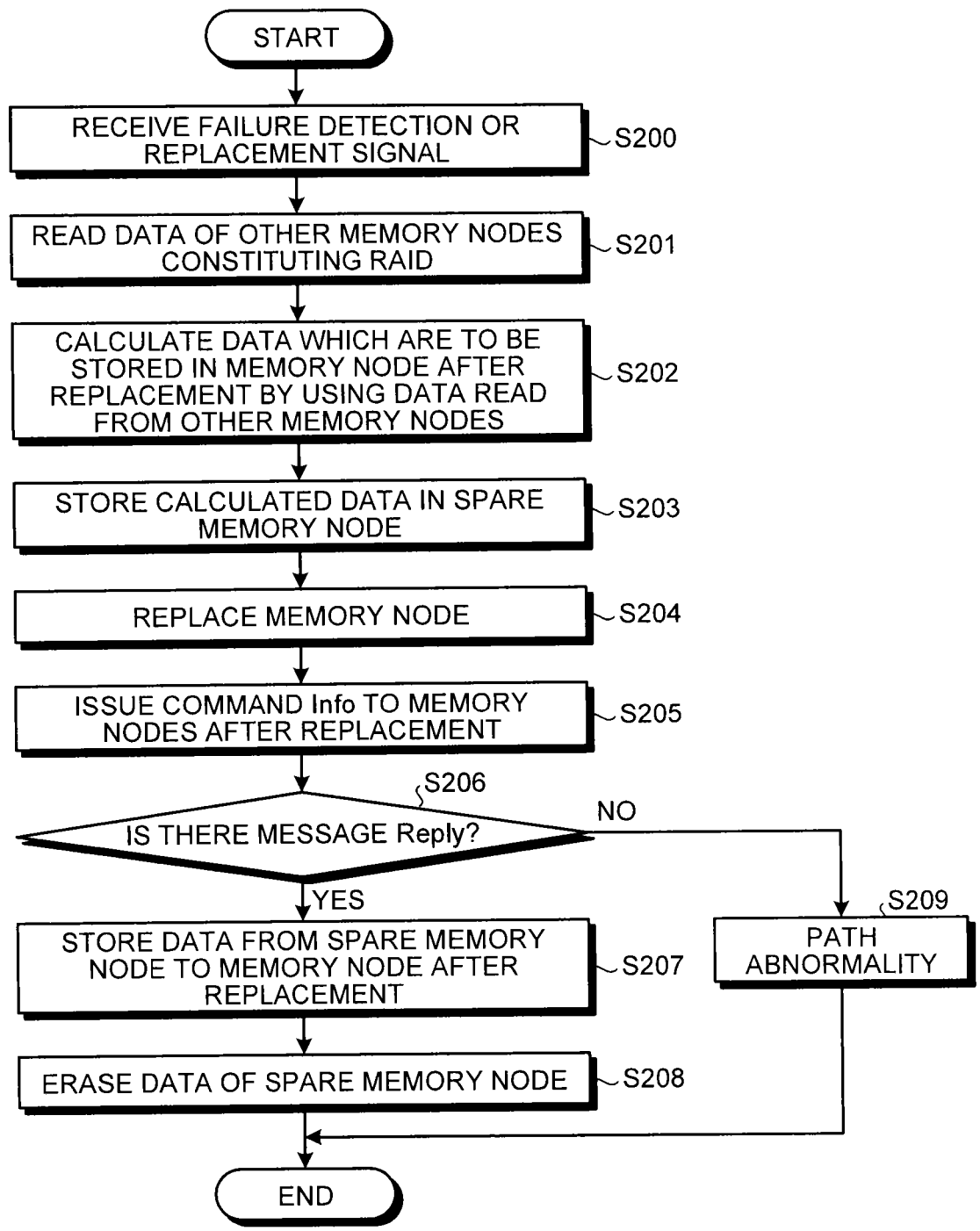
FIG. 17 is a flowchart illustrating an example of the second data recovering process according to the embodiment.

FIG. 16 is a conceptual diagram of a second data recovering process. In the second data recovering process, a spare memory node S is provided in addition to the three memory nodes A, B, and C constituting the RAID. The same components of FIG. 16 as those of the above-described FIG. 14 are denoted by the same reference numerals, and the description thereof is not provided. FIG. 17 is a flowchart illustrating an example of the second data recovering process. The data pieces a, b, and c are stored respectively in the memory nodes A, B, and C, and any one of the data pieces (for example, data piece c) is assumed to be parity.

At the time of normally using the storage device 10, the spare memory node S is not used as a data storage destination, and it is maintained empty. It is preferable that spare memory nodes S be distributed and the physical addresses be mapped thereto, similarly to the other memory nodes as described above. In addition, it is assumed that the controller 100 perceives the physical address of the spare memory node S in advance.

Hereinafter, similarly to the above-described case, the case of performing failure detection or replacement of the memory node B and recovering the data piece b stored in the memory node B will be described as an example (refer to Section 110 of FIG. 16). In the flowchart of FIG. 17, in Step S200, in the case where the failure detection of the memory node B or a replacement signal for the memory node B is notified, the memory node B proceeds to a replacement stand-by state.

Next, in Step S201, the controller 100 reads the data pieces a and c stored in the other memory nodes A and C, constituting the RAID together with the memory node B before the replacement. Next, in Step S202, the controller 100 recovers the data piece b by performing calculation by using the data pieces a and c read from the memory nodes A and C in Step S201 (refer to Section 111 of FIG. 16). The recovered data piece b is temporarily stored in the buffer 101 (refer to Section 112 of FIG. 16).

Next, in Step S203, the controller 100 reads the recovered data piece b recovered in Step S202 from the buffer 101 and stores the recovered data piece b in the spare memory node S (refer to Section 113 of FIG. 16).

Next, in Step S204, the memory node B is replaced with a new memory node B'. At this time, the memory node B' is empty, and no data are stored therein (refer to Section 113 of FIG. 16). When it is confirmed that the memory node B has been replaced with the memory node B', the controller 100 transmits a command Info to the memory node B' (Step S205).

Next, in Step S206, the controller 100 determines whether a message Reply to the command info transmitted in Step S205 is received. When it is determined that the message Reply is received, it may be determined that there is no path abnormality and the replacement of the memory node B with the memory node B' is normally completed. In this case, the process proceed to Step S207, and the controller 100 reads the data piece b from the spare memory node S and stores the read data piece b in the memory node B' after the replacement (refer to Section 114 of FIG. 16).

Next, in Step S208, the controller 100 allows the spare memory node S to be empty by erasing the data piece b from the spare memory node S to recover the function of the spare memory node, so that high reliability is maintained. Therefore, the recovery of the data piece b according to the replacement of the memory node B is completed, and a series of the processes in the flowchart of FIG. 17 is ended.

In the case where it is determined in Step S206 that the message Reply is not received, the process proceeds to Step S209, and it is considered that there is a possibility of occurrence of path abnormality such as disconnection in the path between the controller 100 and the memory node B'. In this case, there is also a possibility that path abnormality does not occur but the replaced memory node B' is in failure. The controller 100 outputs a message indicating, for example, occurrence of path abnormality or the like, and a series of the processes in the flowchart of FIG. 15 are ended.

In this manner, in the case where the spare memory node S is prepared, the calculation result of the data piece b is to be stored in the spare memory node S as a priority. Accordingly, since the RAID is first reconstructed with the memory nodes A, C, and S, a system having higher reliability can be constructed.

In the above configuration, the spare memory node S is separately prepared as a memory node which is not used for normal data storage. However, the configuration is not limited to this example. For example, the memory node in which data are not stored among a plurality of the memory nodes in the storage device 10 may be allocated as the spare memory node S.

In this manner, in the storage device 10 according to the embodiment, a plurality of the data controllers are provided corresponding to a plurality of the memory nodes, so that parallel processing through a plurality of the paths can be performed. Therefore, while data recovering process is performed by a certain data controller, data access in the replacing memory node can be performed by another data controller. In this case, since the replacing memory node is locked actually, simultaneous proceeding of the data recovery and the data access can be implemented by the process between the data controllers. In this case, although the throughput may be decreased, much higher performance can be maintained than that of the related art.

In addition, in the data recovering process, the setting of conditions of the failure detection is important, and it is preferable that the conditions can be changed according to user's request regarding reliability, a running cost, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:

a plurality of memory nodes, each of which includes a storage unit including a plurality of storage areas, each of the plurality of storage areas having a predetermined size, each of the plurality of memory nodes being arranged at a lattice point of a lattice, each of the plurality of memory nodes including input ports and output ports, and each of the plurality of memory nodes being connected, through an input port and output port, to each of one or more adjacent memory nodes among the plurality of memory nodes, the plurality of memory nodes constituting three or more groups, each of the three or more groups including two or more memory nodes, each of the plurality of memory nodes being included in any one group among the three or more groups, and each of the plurality of memory nodes being connected to all other memory nodes in the same group directly or via one or more memory nodes in the same group; and a control unit that is connected to a first memory node that is one of the plurality of memory nodes, the control unit being configured to divide data received from an external computer to generate three or more data pieces each having a predetermined size, the data being indicated by a logical address, generate parity from the three or more data pieces, allocate each of writing destinations of the three or more data pieces and the parity in a different group among the three or more groups, generate packets each addressed to a different destination among the writing destinations, the packets each including a corresponding data piece among the three or more data pieces and the parity, and transmit the packets to the first memory node, wherein when a memory node receives a packet among the transmitted packets through an input port of the memory node, in a case where the received packet is not addressed to the memory node itself, the memory node transmits the received packet to one of memory nodes that are adjacent to the memory node through an output port of the memory node, and in a case where the received packet is addressed to the memory node itself, the memory node performs storing the data piece included in the received packet into a storage unit included in the memory node.

2. The storage device according to claim 1, wherein, in a case where a cycle of allocation of the writing destinations to the plurality of storage areas corresponding to each other in the plurality of memory nodes is completed, the control unit is further configured to change the group of the writing destinations of the parities.

3. The storage device according to claim 1, wherein the control unit is further configured to sequentially allocate the writing destinations of the parities to the three or more groups.

4. The storage device according to claim 1, wherein the control unit is further configured to divide the plurality of memory nodes in two or more directions to generate the three or more groups.

5. The storage device according to claim 1, wherein one of the plurality of memory nodes further includes a detector configured to detect an error bit included in data read from the storage unit and add a result of the detection to a result corresponding to at least one of a reading command and a writing command transmitted from the control unit to transmit the added result to the control unit.

6. The storage device according to claim 1, wherein, when a memory node among the plurality of memory nodes receives a packet among the packets, the memory node determines whether the received packet is addressed to the memory node itself, in a case where the received packet is addressed to the memory node itself, the memory node performs writing of the data piece included in the received packet, and, in a case where the received packet is not addressed to the memory node itself, the memory node transmits the received packet to one of memory nodes that are adjacent to the memory node.

7. The storage device according to claim 1, wherein each of the writing destinations of the three or more data pieces is indicated by a combination of a first address which indicates a memory node and a second address which indicate a storage area, and the control unit determines, based on the logical address, the combination of the first address and the second address for each of the three or more data pieces.

* * * * *